Figure 1:
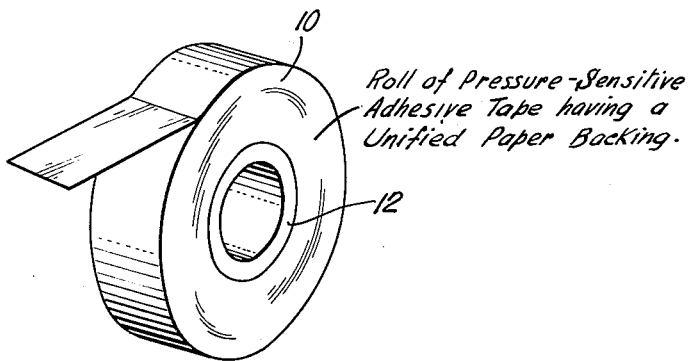

July 27, 1965   C. BARTELL   3,197,330
PROCESS FOR PRODUCING A PRESSURE-SENSITIVE ADHESIVE TAPE HAVING
A PAPER BACKING UNIFIED WITH AN ELASTOMERIC POLYURETHANE
Filed March 28, 1961

INVENTOR
CHARLES BARTELL
BY
ATTORNEY

United States Patent Office 3,197,330
Patented July 27, 1965

3,197,330
PROCESS FOR PRODUCING A PRESSURE-SENSITIVE ADHESIVE TAPE HAVING A PAPER BACKING UNIFIED WITH AN ELASTOMERIC POLYURETHANE
Charles Bartell, Waltham, Mass., assignor to Johnson & Johnson, a corporation of New Jersey
Filed Mar. 28, 1961, Ser. No. 98,894
8 Claims. (Cl. 117—122)

This invention relates to improved pressure-sensitive adhesive tapes having a unified paper backing and a process for making same. More particularly, this invention has to do with such a tape and process in which the unifying agent is an elastomeric polyurethane.

In order to facilitate the use of paper as a backing for pressure-sensitive adhesive tape, the art has found it necessary to unify such papers with fiber bonding extensible materials. Such unification of the paper has been required to render the paper sufficiently extensible or elongatable to permit adhesive tapes made therefrom to conform to irregularly shaped surfaces to which such tapes are applied, and even more importantly, to give the paper backing sufficient internal strength to render it resistant to delamination when in a roll of such tape the paper backing is exposed to the adhesive forces exerted by an overlying ply during unwinding. The term "delamination resistance" as used in this specification means the resistance of a paper web to splitting or separation of the paper into plies, layers or laminae measured as described in TAPPI, vol. 40, No. 8, August 1957, pp. 676–680.

Heretofore, many different kinds and types of such unifying agents have been suggested. Previously employed unifying agents have included proteinaceous mixtures (e.g., glue-glycerine), natural rubber solutions, and synthetic rubber latices. The synthetic rubber latices have been the most widely used materials. Such synthetic rubber latices, as more fully described in United States Letters Patent Nos. 2,726,967; 2,848,105; and 2,848,355, include aqueous dispersions of copolymers of butadiene and at least one other unsaturated monomer such as acrylonitrile, methacrylate, methacrylic acid, acrylic acid, or styrene. While each of these unifying agents have found commercial acceptance in the art, yet some have definite drawbacks. For example, papers unified with a glue-glycerine mixture are water-sensitive and tapes made from such papers can't be satisfactorily used in wet sanding operations; and papers impregnated with aqueous dispersions of synthetic rubber latices have poor electrical properties and tapes made from such paper backings cannot be satisfactorily used for electrical insulation.

It is a salient object of the present invention to provide an improved pressure-sensitive adhesive tape having unified paper backing and to provide a novel method for making same.

Another object of this invention is to provide a pressure-sensitive paper-backed adhesive tape which can be used for a multitude of purposes. A still further object of this invention is to provide a paper-backed pressure-sensitive adhesive tape having improved delamination resistance and edge tear properties. Other objects will be apparent from, or disclosed in, the following description.

I have found that the foregoing objects can be obtained by incorporating the initial addition product of a polyester or polyether and an organic diisocyanate (hereinafter referred to as a "prepolymer") into a paper and then further reacting said materials until an elastomeric polyurethane is formed in the paper in situ. Papers unified in this way may then be coated with a pressure-sensitive adhesive composition, rolled upon itself and slit into desired widths. Pressure-sensitive adhesive tapes made in this fashion show high delamination resistance and high edge tear.

In carrying out this invention, the initial addition product or prepolymer of the polyester or polyether and the organic diisocyanate is first formed, then the prepolymer is admixed with further quantities of the polyether or polyester used in formation of the prepolymer in a solvent for the materials such as an aromatic hydrocarbon, e.g. xylene, toluene and the like, the solution is incorporated into the paper web by any of the conventional methods as by dipping, saturation or impregnation, and the impregnated paper web is dried to remove solvent and treated at elevated temperatures until an elastomeric polyurethane is formed in situ in the paper web.

The initial addition product or prepolymer is prepared by reacting a suitable polyester or polyether with an organic diisocyanate at elevated temperatures under inert conditions. The reaction atmosphere should be inert, i.e. free of isocyanate-reactive materials (other than the polyether or polyester). This requires that the reaction be conducted in the absence of water. An inert atmosphere such as nitrogen should be used. The mol ratio of the reactants should be such that there is one molecule of diisocyanate for each isocyanate-reactive group in the polyester or polyether. For most purposes there are thus required 2 mols of an organic diisocyanate for each mol of the polyether or polyester. In most cases the molar ratio of organic diisocyanate to polyester or polyether should be maintained at from about 1.5:1 to 10:1. The precise temperature and time required to form the prepolymer will depend upon a variety of factors including the nature of the reactants employed and the extent of polymerization desired. Generally, temperatures ranging from 80° C. to 110° C. and reaction times of from 90 to 150 minutes have been found satisfactory.

The organic diisocyanates employed in preparing the prepolymer may be represented by the general formula OCN—R—NCO, where R is a divalent hydrocarbon radical. Suitable organic diisocyanates include aromatic, aliphatic, cycloaliphatic diisocyanates and combinations thereof. Representative aryl diisocyanates include m- and p- phenylene diisocyanate, m-tolylene diisocyanate, p,p' - diphenyl diisocyanate, 3,3' - bitolylene - 4,4' - diisocyanate, 1,5-naphthalene diisocyanate, and p,p'-diphenylmethane diisocyanate, and diphenyl ethylene diisocyanate. Representative aliphatic diisocyanates include polymethylene diisocyanates such as ethylene diisocyanate, 1,4-tetramethylene diisocyanate, 1,10-decamethylene diisocyanate, and alkylene diisocyanates such as propylene 1,2-diisocyanate. Representative cycloaliphatic diisocyanates include 1,4-diisocyanate-cyclohexane, and 4,4'-methylene-bis(cyclohexyl isocyanate) and 1,5-tetrahydronaphthalene diisocyanate. The diisocyanates may contain other substituents, e.g. 3,3'-diisocyanate 4,4'-dimethyl carbanilide. Dimers of the diisocyanates may also be used, e.g. the dimer of m-tolylene diisocyanate.

The polyesters which may be used in forming the prepolymer are the reaction products of a polybasic acid such as sebacic, succinic, azelaic, adipic, phthalic, terephthalic or maleic acid, and a polyhydric alcohol such as ethylene glycol, propylene glycol, pentaerythritol, glycerol and the like or combinations thereof. The polyesters should preferably have a molecular weight between about 500 to 2000. Papers impregnated with prepolymers formed from polyesters of a molecular weight below about 500 are not sufficiently flexible and have inadequate edge tear strength. On the other hand, prepolymers formed from polyesters having a molecular weight above about 2000 are too viscous for convenient impregnation of papers. Preferably, the polyester should be prepared with an excess of the polyhydric alcohol so that the polyester will have terminal hydroxy groups for interreaction with the organic diisocyanate.

The polyethers which are suitable for preparation of the prepolymer include the polyalkylene ether glycols such as polyethylene ether glycols, poly-1,2-propylene ether glycols, polybutylene ether glycols, and polydecamethylene ether glycols, and such other polyethers as polyepichlorohydrin and polystyrene glycols.

After formation of the prepolymer, the unifying agent composition is prepared by combining the prepolymer with additional amounts of the polyester or polyether in a solvent. The polyester or polyether is added in a proportion such that the over-all ratio of mols of hydroxyl groups to mols of isocyanate groups lies within the range of from 0.3:1 to 1.5:1. Excess isocyanate groups are to be avoided to prevent reaction of the isocyanate groups with moisture with a consequent loss of tear strength of the papers unified with such compositions. Also, if an excess polyester or polyether is used, such excess will serve as a plasticizer and further improve the tear strength of papers unified therewith. A catalyst or accelerator for the further reaction or curing of the unifying composition is preferably added to the unifying agent mixture. A particularly useful class of catalyst or accelerator is the organic amines such as N-methylmorpholine, triethylamine, dimethylaniline, 1,4-bis(2-hydroxylpropyl)-2-methyl piperazine, and dimethylethanolamine. Usually the catalyst or accelerator is added in an amount of about two percent (2%) based on the total weight of the prepolymer and the polyester or polyether added.

The solvent employed as a vehicle for the unifying agent composition may be any inert, volatile organic liquid in which the prepolymer and polyester or polyether is soluble. Many solvents will be suitable and will readily occur or be apparent to those skilled in the art. Among the solvents which may be utilized are aromatic hydrocarbons such as benzene, xylene, toluene and the like; halogenated hydrocarbons such as methylene chloride, trichloroethylene, ethylene dichloride and the like. Preferably, the solvent should have a boiling point below 140° C. so that it may be readily removed from the paper.

The unifying agent composition prepared as described above is then used to impregnate the paper web. Any conventional method can be used to incorporate the unifying agent into the paper backing as by dipping, immersing the paper web in a bath composed of the unifying agent. An amount of unifying agent should be deposited within the paper fibers to obtain sufficient delamination resistance to enable the unified paper web to withstand the forces of adhesion of the pressure-sensitive adhesive coated on the paper web when unwinding an overlying ply of tape in a roll thereof. Usually, from about 10% to 100% of the unifying agent is incorporated in the paper based on the weight of the unimpregnated or non-unified paper. Preferably, the unifying agent or elastomeric polyurethane should be between about 25% to 75% by weight of the non-unified paper. Any of the thin flexible porous saturating grade papers used in the pressure-sensitive tape industry may be used as a backing for this unifying agent composition. The paper may be flat, creped, crimped, embossed, or extensibilized. It may be made in whole or in part from wood, rope, or rag fibers.

After suitable incorporation of the unifying agent into the paper backing, the unified backing is usually subjected to a drying step to remove the solvent and then treated at elevated temperatures to cure the unifying agent composition. The temperature and time of the curing step is so controlled as to convert the unifying agent into an elastomeric polyurethane. The temperatures and times required to effect the cure will depend upon a variety of factors including the nature of the reactants, the presence or absence of an accelerator or catalyst, the character of the backing, etc. Generally, I have found that temperatures above about 20° C. and below about 175° C. are preferred. Curing within these temperatures will normally require from about 7 days to about 0.5 minute.

The unified and cured paper backing is then coated in a suitable manner with a suitable pressure-sensitive adhesive mass to form the new and improved adhesive tape. Such pressure-sensitive adhesive masses are normally based on an elastomer such as any of the natural or synthetic rubbers, e.g. pale crepe rubber, smoked sheets, reclaimed rubber, Buna-S and Buna-N type rubbers, polyisobutylene, polyvinyl ether, polyacrylates. The mass may be especially compounded or interpolymerized to provide the balance of adhesiveness and cohesiveness characteristic of pressure-sensitive adhesive masses. Alternatively, any of the conventional tackifiers such as rosin, dehydrogenated rosin, hydrogenated rosin, polyterpenes, coumarone-indene resins, polyalkyl styrene, or any of the other tackifiers may be used in the proportions that are so well known in the art. Other ingredients such as inert fillers (e.g. zinc oxide, calcium carbonate, clay and the like), antioxidants, and pigments may be included in the adhesive mass if desired. Typical pressure-sensitive adhesive masses are disclosed in British Patent No. 611,211 and United States Letters Patent Nos. 2,415,901; 2,405,926; 2,397,774; 2,697,084; and 2,750,314, and in many other patents.

A primer coating may be used between the paper backing and the pressure-sensitive mass to improve the anchorage of the adhesive to the backing. Such primer coatings are well known in the art, see for example, U.S.P. 2,886,467. For ease in unrolling the tape, it is sometimes desirable to provide upon the surface of the backing, opposite that to which the adhesive mass is applied, a coating which decreases the adhesion of the adhesive mass to the face surface of the pressure-sensitive adhesive tape. Any suitable conventional release coating for such products may be employed as, for example, the type disclosed in U.S.P. 2,913,355 or U.S.P. 2,914,167.

The following specific examples will serve to further illustrate the invention. It is to be understood that the invention is not to be limited to specific details shown therein.

*Example 1*

A prepolymer was formed by heating 2 mols (348 grams) of m-tolylene diisocyanate and 1 mol (1856 grams) of a polyester designated Paraplex U-148 at a temperature of 90° C. for 2 hours in the absence of air and water under a nitrogen atmosphere. Paraplex U-148 is a polyester made and sold by Rohm & Haas Company. Paraplex U-148 has an average molecular weight of about 1856 and has, on the average, 2.09 hydroxyl groups per molecule.

A unifying agent formulation was then prepared by mixing 100 parts by weight of the prepolymer formed above with 156 parts by weight of the polyester designated Paraplex U-148, 4.6 parts by weight of N-methyl morpholine catalyst, and 136 parts by weight of toluene solvent. Four mil rope paper was saturated with this unifying agent formulation and dried at 250° F. for two minutes. The unified paper contained 100 parts by weight of elastomeric polyurethane based on 100 parts by weight of the non-unified paper. The unified paper backing was allowed to cure for one week at room temperature. The cured paper backing was primed with a solution made up of 320 grams of a mixture composed of a 25% solids solution of pale crepe rubber, 40 grams of a 50% solution of p,p'-diphenylmethane diisocyanate, and 210 grams of toluene. The primed paper was allowed to age or cure for about 24 hours before mass coating. The primed unified paper was backsized with a mixture of 100 parts of an urea formaldehyde alkyd resin (Du Pont 59117 sold by E. I. du Pont de Nemours & Company), 13.6 parts of a copolymer of vinyl acetate and stearyl maleate (Shawinigan Resin C-254H), and 0.45 part of phosphoric acid. The backsized and primed paper was dried at 200° F. and cured at 350° F. The primed surface of the backings was then mass coated with a normally tacky and pressure-sensitive adhesive composition comprising:

| | Percent by weight |
|---|---|
| Pale crepe rubber | 36.5 |
| Copolymer of butadiene and styrene (GRS 1022) | 12.2 |
| Polyterpene resin (Piccolyte S115) | 36.1 |
| Oil-soluble octylphenol-formaldehyde resin (Amberol ST 137) | 4.2 |
| Modified phenol-formaldehyde resin (Amberol M 88) | 4.2 |
| Zinc resinate | 4.2 |
| M-tolylene diisocyanate | 1.0 |
| 2,5-ditertiary amyl hydroquinone (Santover A) | 0.8 |
| 2,6-ditertiary butyl p-cresol (Ionol) | 0.8 |
| | 100.0 |

The tape thus prepared was tested for delamination resistance, edge tear, and insulation resistance. The following results were obtained:

| Delamination Resistance (Oz./Inch-Width) | Edge Tear (lbs.) | Insulation Resistance (Megaohms) |
|---|---|---|
| 54 | 6.8 | 5.7 |

Delamination resistance was measured by the procedure reported in TAPPI, vol. 40, No. 8, August 1957, pp. 676–680. Edge tear was measured by the procedure of TAPPI, T470 m-54 modified so that the stirrup is an inverted V-shape with a 45° angle tearing edge, a ¼" hole is punched in the sample, and the inverted V-shaped stirrup is inserted through said hole. Insulation Resistance was measured by the method described in A.S.T.M. D-1000.

*Example 2*

A prepolymer is formed by reacting one mol of a polyester made from one mol of sebacic acid and 1.1 mols of ethylene glycol and 2 mols of p,p'-diphenylmethane diisocyanate. The polyester has an average molecular weight of about 2000. The reaction is conducted by adding the polyester slowly over a two hour period to a 50% solution of p,p'-diisocyanate-diphenylmethane in toluene solution. The reaction temperature originally is at 50°–60° C. The reaction is carried out under an inert nitrogen atmosphere. The temperature is raised to 80°–90° C. during addition of the polyester. The reaction is conducted for an additional two hours while maintaining the temperature at 80°–90° C. The reaction mixture (prepolymer) is then cooled to room temperature.

The unifying agent formulation is then prepared by mixing the prepolymer prepared above with one mol of the polyester used in making the prepolymer. Sufficient toluene is added to bring the mixture to 15% by weight of active ingredients. Triethylamine, in an amount of 2% based on the weight of the active ingredients is added as a catalyst. A sheet of creped saturating grade paper, 30 lb. basis weight (24" x 36" x 480 ream) is impregnated to a level of 25 percent by weight of the elastomeric polyurethane based on the weight of the unimpregnated paper by dipping the sheet in the composition and then knifing off the excess. After drying the paper by removal of the solvent, the sheet is cured at 150° C. for 30 minutes. The resulting unified paper backing has adequate tear and delamination properties and is suitable as a backing for pressure-sensitive adhesive tape.

*Example 3*

Various polyurethane unified papers were prepared as follows:

A prepolymer was prepared by reacting 245 grams of m-tolylene diisocyanate with 1050 grams of the polyester designated Paraplex U-148 (see Example 1 above). The prepolymer was prepared in the same manner as described in Example 2 above, except that the reaction was continued for only 1 additional hour after completing the addition of the polyester. A series of unifying agent compositions are then prepared from this prepolymer. The compositions had the following formulations:

| Unifying Agent Composition No. | Prepolymer (Grams) | Additional Polyester Added (Paraplex U-148) (Grams) | Overall Ratio of Mols —OH to Mols —NCO | Percent Impregnation (Based on Weight of Unimpregnated Paper) |
|---|---|---|---|---|
| 1 | 127.7 | 0 | 0.42 | 95 |
| 2 | 109.9 | 17.8 | 0.50 | 108 |
| 3 | 96.4 | 31.4 | 0.59 | 100 |
| 4 | 86.0 | 41.8 | 0.67 | 112 |
| 5 | 77.5 | 50.2 | 0.76 | 104 |
| 6 | 70.5 | 57.2 | 0.84 | 105 |
| 7 | 64.8 | 62.9 | 0.92 | 107 |
| 8 | 59.8 | 67.9 | 1.01 | 97 |
| 9 | 55.5 | 72.2 | 1.09 | 99 |
| 10 | 51.9 | 75.8 | 1.18 | 96 |
| 11 | 48.6 | 79.3 | 1.26 | 97 |

In addition each of the unifying agent compositions contained 70.0 grams of toluene and 2.4 grams of N-methyl morpholine. A sheet of 4 mil electrical grade rope paper was impregnated with each of the foregoing unifying agent compositions by dipping the sheet in the unifying agent composition and then knifing off the excess saturant. Each of the sheets was dried and then cured at 150° C. for 30 minutes. Delamination resistance and edge tear measurements were then made (see Example 1 above for a description of the test methods used) on each of the sheets and the following results obtained:

| Unifying Agent Composition No. | Delamination Resistance (Ozs./Inch-Width) | Edge Tear (Lb./Inch) |
|---|---|---|
| 1 | 53 | 2.3 |
| 2 | 62 | 3.4 |
| 3 | 62.5 | 3.2 |
| 4 | 60 | 2.6 |
| 5 | 62 | 2.8 |
| 6 | 61.5 | 2.9 |
| 7 | 65 | 3.4 |
| 8 | 67 | 3.5 |
| 9 | 63 | 4.0 |
| 10 | 63 | 3.4 |
| 11 | 50 | 5.0 |

Reference is now made to the drawing illustrating by way of example the present invention.

FIG. 1 shows a roll 10 of pressure-sensitive adhesive tape wound directly upon itself over a core 12.

Figure 2:
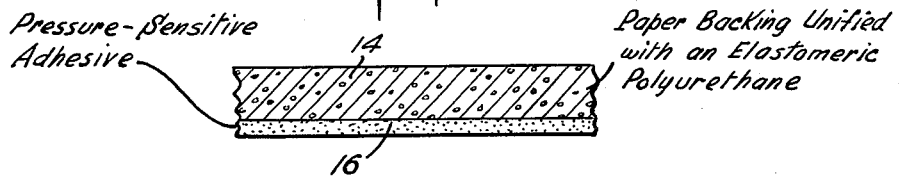

FIG. 2 is a magnified vertical cross-section of the tape shown in FIG. 1. The tape comprises a paper backing 14 unified with an elastomeric polyurethane and a coating of a pressure-sensitive adhesive 16 applied to a surface of said unified paper backing 14.

It will be appreciated that many variations in the invention described herein may become apparent to those skilled in the art. The invention is not to be limited except as set forth in the appended claims.

What is claimed is:

1. A method of making a pressure-sensitive adhesive tape comprising forming a prepolymer by reacting an organic compound having a reactive-hydrogen group selected from the class consisting of polyethers and polyesters with an organic diisocyanate, the molar ratio of said organic compound to said organic diisocyanate being at from about 1.5:1 to 10:1, mixing said prepolymer with further amounts of said organic compound having a reactive-hydrogen group in an inert organic solvent for said prepolymer and said organic compound so that the over-all ratio of mols of hydroxyl groups to mols of isocyanate groups lies within the range of from about 0.3:1 to 1.5:1, incorporating said solvent mixture into a thin flexible paper web in an amount to yield from about 10 to 100% by weight of elastomeric polyurethnae based on the weight of the non-unified paper, curing said mixture in said paper web so that an elastomeric polyurethane is formed, and coating a pressure-sensitive adhesive on at least one surface of said cured paper web.

2. A method of making a pressure-sensitive adhesive tape as defined in claim 1 wherein said curing step is conducted at a temperature of from about 20° C. to 175° C.

3. A method of making a pressure-sensitive adhesive tape comprising forming a prepolymer by reacting a polyester having a molecular weight between about 500 and 2000 and containing terminal hydroxyl groups and an organic diisocyanate, the molar ratio of said polyester to said diisocyanate being at from about 1.5:1 to 10:1, mixing said prepolymer with further amounts of said polyester in an inert organic solvent for said prepolymer and said organic compound so that the over-all ratio of mols of hydroxyl groups to mols of isocyanate groups lies within the range of from about 0.3:1 to 1.5:1, incorporating said solvent mixture into a thin flexible paper web in an amount to yield from about 10 to 100% by weight of elastomeric polyurethane based on the weight of the non-unified paper, curing said mixture in said paper web so that an elastomeric polyurethane is formed, and coating a pressure-sensitive adhesive on at least one surface of said cured paper web.

4. A method of making a pressure-sensitive adhesive tape as claimed in claim 3, wherein said organic diisocyanate is m-tolylene diisocyanate.

5. A method of making a pressure-sensitive adhesive tape as claimed in claim 3, wherein said organic diisocyanate is p,p'-diphenylmethane diisocyanate.

6. A method of making a pressure-sensitive adhesive tape comprising forming a prepolymer by reacting a polyalkylene ether glycol and an organic diisocyanate, the molar ratio of said glycol to said diisocyanate being at from about 1.5:1 to 10:1, mixing said prepolymer with further amounts of said polyalkylene ether glycol in an inert organic solvent for said prepolymer and said organic compound so that the over-all ratio of mols of hydroxyl groups to mols of isocyanate group lies within the range of from about 0.3:1 to 1.5:1, incorporating said solvent mixture into a thin flexible paper web in an amount to yield from about 10 to 100% by weight of elastomeric polyurethane based on the weight of the non-unified paper, curing said mixture in said paper web so that an elastomeric polyurethane is formed, and coating a pressure-sensitive adhesive on at least one surface of said cured paper web.

7. A method of making a pressure-sensitive adhesive tape as claimed in claim 6, wherein said organic diisocyanate is m-tolylene diisocyanate.

8. A method of making a pressure-sensitive adhesive tape as claimed in claim 6, wherein said organic diisocyanate is p,p'-diphenylmethane diisocyanate.

References Cited by the Examiner

UNITED STATES PATENTS

| 2,967,117 | 1/61 | Arledter et al. | 117—155 X |
| 2,981,700 | 4/61 | Parker et al. | 260—2.5 |
| 2,981,719 | 4/61 | Muhlhausen et al. | 260—75 |
| 3,043,807 | 7/62 | Snyder et al. | 260—75 |

FOREIGN PATENTS

| 768,075 | 2/57 | Great Britain. |

WILLIAM D. MARTIN, *Primary Examiner.*

MURRAY KATZ, RICHARD D. NEVIUS, *Examiners.*